United States Patent [19]

Flament et al.

[11] Patent Number: 5,458,300
[45] Date of Patent: Oct. 17, 1995

[54] METHOD FOR CONTROLLING THE ATTITUDE OF A SATELLITE AIMED TOWARDS A CELESTIAL OBJECT AND A SATELLITE SUITABLE FOR IMPLEMENTING IT

[75] Inventors: Patrick Flament, Le Cannet, France; Miguel Molina-Cobos, Madrid, Spain

[73] Assignee: Aerospatiale Societe Nationale Industrielle, Paris, France

[21] Appl. No.: 168,931

[22] Filed: Dec. 16, 1993

[30] Foreign Application Priority Data

Dec. 17, 1992 [FR] France ................... 92 15231

[51] Int. Cl.⁶ ..................... B64G 1/24
[52] U.S. Cl. ............ 244/169; 244/171; 364/459
[58] Field of Search ............... 244/158 R, 164, 244/165, 168, 169, 171; 250/203.4; 364/434, 459

[56] References Cited

U.S. PATENT DOCUMENTS

| | | | |
|---|---|---|---|
| 4,997,146 | 3/1991 | Wey Aude, Jr. | 244/171 |
| 5,042,752 | 8/1991 | Surauer | 244/164 |
| 5,080,307 | 1/1992 | Smay | 244/171 |
| 5,227,385 | 1/1994 | Flament | 244/171 |
| 5,255,879 | 10/1993 | Yocum | 244/164 |
| 5,348,255 | 9/1994 | Abreu | 244/171 |

*Primary Examiner*—Galen L. Barefoot
*Attorney, Agent, or Firm*—Remy J. VanOphem; John VanOphem

[57] ABSTRACT

A method of controlling the attitude of a satellite according to which the direction of a predetermined celestial object is defined in a frame of reference related to the satellite, the instantaneous angular velocity vector of the satellite is detected and, by means of an actuating assembly, torques are applied to the satellite which are defined by a control law so as to rotate the satellite about the direction while orienting an aiming axis related to the satellite in the same direction, involves defining the direction of the predetermined celestial object in a frame of reference related to the satellite by a first quantity representing a first angle measured between an axis of sight and the projection of the direction onto a first reference plane containing the axis of sight and by a second quantity representing a second angle defined by the axis of sight and the projection of the direction onto a second reference plane containing the axis of sight, the second angle being calculated from the first angle and from the instantaneous angular velocity vector of the satellite, while a satellite for implementing the method includes a body; a sensor having the axis of sight; an actuating assembly; an attitude control unit for generating signals for applying the torques to the satellite; a unit for measuring the rotation velocity; and a processing unit calculating the second quantity.

27 Claims, 3 Drawing Sheets

METHOD FOR CONTROLLING THE ATTITUDE OF A SATELLITE AIMED TOWARDS A CELESTIAL OBJECT AND A SATELLITE SUITABLE FOR IMPLEMENTING IT

BACKGROUND OF THE INVENTION

1. Field of the Invention

The present invention concerns a method for aiming a satellite with respect to a celestial or heavenly the sun or a star for example, and a device suitable for implementing it.

Satellite in this case means any artificial object moving in the solar system. This object may in particular be in an orbit around the earth or any other planet in the solar system, in an orbit around a satellite of any planet in the solar system, or in a solar orbit, possibly a transfer orbit between two planets.

2. Description of the Prior Art

As is known, satellites have, for the purpose of controlling their orbit and attitude, sensors and actuators connected to logic processor units within a system normally referred to as the attitude and orbit control system. The logic processor units are often integrated within an on-board computer, the actuators including for example thrusters (and/or magnetic coils, and/or gears) while the energy consumed on board is provided by batteries, solar cells subjected to solar radiation and/or propellants used for thrust propulsion in particular for orbit control.

As for the sensors, these are in practice of several types, depending on the nature, size, brightness, etc of the heavenly body (earth, sun or star) which they serve to detect. There are currently single-axis or dual-axis sensors.

Single-axis sensor means in general an appliance providing an angular coordinate of the direction of the heavenly body aimed at in a frame of reference peculiar to the sensor. In practice an axis of sight and a sensing axis are defined for the sensor, and the angular coordinate is for example the angle made by the axis of sight of the sensor to the projection of the direction of the heavenly body aimed at onto the plane containing the axis of sight perpendicular to the sensing axis.

A dual-axis sensor means an appliance supplying two angular coordinates of the direction of the heavenly body aimed at in a frame of reference related to the sensor (which determines this direction completely). The appliance therefore has the function of two single-axis sensors with identical axes of sight and separate sensing axes, generally orthogonal. For detecting the sun, such a dual-axis sensor is in fact normally formed by associating two such single-axis sensors.

In fact a satellite may be caused to adopt several attitudes during its life after being released from its launch vehicle.

Thus, for example, the nominal attitude of a satellite of the triple-axis stabilized type moving on a circular terrestrial orbit consists of having a Z axis, known as the yaw axis, pointing towards the earth, a Y axis known as the pitch axis, perpendicular to the plane of the orbit, and an X axis known as the roll axis, perpendicular to the Z and Y axes and having the same direction as the instantaneous linear velocity of the satellite on its orbit, the direction of the Y axis being such that the frame of reference (X, Y, Z) is positive. Such a nominal attitude is controlled by means of a terrestrial sensor, either alone or combined with solar sensors or a stellar sensor.

Other types of attitude may be envisaged, notably just before a satellite is put into its operational orbit, or after a serious failure of any type affecting in particular the attitude and orbit control system.

It is normal in such cases to attempt to put the satellite into a so-called sun-aimed attitude in which it is in slow rotation about an axis pointing towards the sun, chosen so as to be close to a principal inertia axis and such that the satellite solar panels are illuminated. This enables the satellite to await subsequent commands, while ensuring its safety, that is to say:

ensuring the recharging of the batteries with which the satellite is equipped, powering the various items of equipment required by the satellite: sensor, computer, heaters, remote control and telemetry, in particular; and ensuring illumination of the satellite by the sun so that the thermal configuration of the satellite is homogeneous and maintains the equipment within the permitted temperature range.

Conventionally, this attitude control mode is referred to as the sun acquisition mode and is based on a sequencing of the following type given by way of example:

seeking the sun by rotating the satellite about one axis (for example the roll axis), so that the field of view of at least one solar sensor encounters the sun;

rotating the satellite about one axis (for example the pitch axis) so as to bring the direction of the sun towards the desired direction;

rotating the satellite about the direction of the sun, and controlling this direction so that it becomes identical with the desired direction (for example the roll axis).

The satellite thus being in a sun-aimed attitude, the requirements of the mission generally require it to come (or return) to its nominal attitude, that is in practice for it then to be aimed (or re-aimed) towards the earth (or a star). The method of seeking the earth or star which is conventionally used, in such an earth acquisition mode or star acquisition mode, consists, during the seeking stage, of putting the satellite into slow rotation about an axis aimed towards the sun, this axis being chosen so that the field of view of the earth (or star) sensor necessarily encounters the earth (or star).

In some cases, when it is not possible to seek the earth directly, a reference star is initially sought, the Pole Star for example: once the star has been found as described above, the satellite is, from the measurements of the star sensor, controlled with respect to rotation so as to bring the field of view of the earth sensor facing the earth: this is then referred to as acquisition of the earth via the star.

The rotation axis pointed towards the sun during the seeking of the earth or star forms, with the axis of sight of the earth or star sensor, an angle at least approximately equal to the sun-satellite-earth angle or sun-satellite-star angle. This axis may be the direction which the sun should have in the frame of reference related to the satellite once the latter is in its attitude pointed towards the earth or star.

These different attitude control modes therefore require the direction of the sun or star in question to be determined for the purpose of taking it into account in the control loops using the control law corresponding to the current stage of the attitude control mode: in particular in the last phase of the sun acquisition mode, in the first phase of the earth or star acquisition modes and in the last phase of the acquisition of the earth via a star.

Prior art Patents which relate to such a change in nominal attitude, after an intermediate change into a sun-aimed attitude, are French Patent Nos. 2,407,860 and 2,649,809 (MESSERSCHMITT-BOLKOW-BLOHM), European Patent No. 0,338,687 (BRITISH AEROSPACE), and U.S. Pat. No. 5,080,307 (HUGHES AIRCRAFT).

In the first three patents, the direction of the sun is determined from the measurement of two single-axis solar sensors whose sensing axes are perpendicular, or from a twin-axis solar sensor.

Likewise, in European Patent 0,338,687, the direction of the star is computed from the measurement of two single-axis stellar sensors whose sensing axes are perpendicular, or from a twin-axis stellar sensor.

The computation is carried out by determining the three coordinates of the unit vector of the instantaneous direction of the sun or star in the frame of reference of the sensor from two angular measurements defining the orientation of this direction in the frame of reference.

Control is effected by applying demands of the type:

$$\vec{U}=-Kd*[\vec{\omega}-C*\vec{S}_{s/c}]-Kp*[\vec{S}_{s/c}\wedge\vec{SR}]$$

where:

$\vec{U}$=demand signal to be applied as determined by the control law $\vec{S}_{s/c}$=unit vector of the instantaneous direction of the heavenly body in question (sun or star) calculated from the angular measurements of the sensors $\vec{SR}$=unit vector of the reference direction of the heavenly body in question $\vec{\omega}$=measured velocity vector C=velocity of rotation demanded about the direction $\vec{SR}$ Kd=velocity regulation gain Kp=position regulation gain $\wedge$=vector product (or, in English, cross product).

During the sun, earth or star acquisition modes, the velocity of the satellite about its three axes is measured (by means of gyrometers, for example) and used in the attitude control laws, solely for the purpose of damping the positional control or carrying out the velocity control.

An earth-seeking mode using a single solar sensor is described in French Patent No. 2,649,809. This patent proposes a method in which the direction of the sun is not completely determined. The control law is based on the fact that the rotation of the satellite causes coupling between the errors in attitude according to the measurement axis and according to the non-measurement axis. Thus, when the single-axis solar sensor detects an error, the control law generates a command suitable for cancelling out this error according to the measurement axis, while the non-measurable error on the other axis is eliminated by coupling.

The control law used is of the type:

$$\vec{U}=-Kd*[\vec{\omega}-C*\vec{SR}]+Kp*[\vec{SR}\wedge\vec{e}_M+(\vec{SR}*\vec{SR}^T)\vec{e}_M$$
$$\vec{e}_M]*L(N_{sy}-N_{by})$$

where:

$\vec{U}$=demand to be applied $\vec{SR}$=unit vector of the reference direction of the sun $\vec{SR}^T$=transposed unit vector of the reference direction of the sun $\vec{\omega}$=measured velocity vector C=rotation velocity demanded Kd=velocity regulation gain Kp=position regulation gain $\vec{e}_M$=measurement axis vector $N_{sy}$=solar sensor measurement $N_{by}$=correction of the solar sensor measurement I=identity matrix L=limitation factor $\wedge$=vector product (or, in English, cross product).

It will be noted that this command includes a term relating to velocity control according to three axes and a term relating to positional control according to two axes, namely the measurement axis and an axis perpendicular to this measurement axis and to the reference direction of the sun, referred to as the non-measurable component axis.

This method has the following drawbacks:

complexity of the control laws, which are very different from the conventional laws of the earth and sun acquisition modes;

poor accuracy of aiming about the non-measurable component axis since this axis is controlled passively by coupling and the error in attitude about this axis is never measured or determined; and difficulty in using this control law to generate thruster commands on the aforesaid two axes since that requires:
either a complicated logic for generating impulses of different durations on the different thrusters: the impulse modulator conventionally used on known satellites is then not applicable,
or using thrusters having specific orientations suitable for producing torques on both axes, which de-optimizes the system of attitude control of the satellite by thrusters since the directions of these thrusters are then imposed by the datum of these two axes.

An earth-seeking mode using a single solar sensor based on coupling between axes due to the rotation is also described in the publication: "The attitude and orbit control of the EUTELSAT II spacecraft" §6.11 page 95; Symposium on Automatic Control in Space - IFAC - 17-21/7/1989. This document proposes an earth-seeking mode in which the reference direction of the rotation vector of the satellite during earth seeking is chosen so that it forms, to the direction of the sun, an angle equal to the earth-satellite-sun angle and so that its component which cannot be measured is zero. This article deals with the pitch component, which amounts to saying that the sun is maintained in the XZ plane of the satellite throughout the earth-seeking phase and that the final attitude at the time of sensing the earth has a yaw angular difference. During earth seeking, only velocity control about the direction $\vec{SR}$ is suggested, so that the control law used by this method is probably of the type:

$$\vec{U}=-Kd*[\vec{\omega}-C*\vec{SR}]$$

where:

$\vec{U}$=demand to be applied $\vec{SR}$=unit vector of the reference direction of the sun $\vec{\omega}$=velocity vector measured C=velocity of rotation about $\vec{SR}$ Kd=velocity regulation gain This method has the following drawbacks:

the necessity for two additional stages: pitch rotation to bring the sun facing the sensor used, and then yaw rotation to cancel out the yaw error due to the particular choice of the reference direction of the sun; and poor accuracy of aiming, which deteriorates over time because of drift in the gyrometers and because the control law does not include the positional control term. This poor aiming accuracy:

prevents its application to the sun acquisition mode, the long duration of which (typically several hours) would, with this type of law, result in latent aiming errors, prevents its application to the star acquisition method, which requires great aiming accuracy because of the need to recognize the star; and the risk, in some cases, of resulting in failures of the earth acquisition.

On the other hand, the present invention relates to a method for aiming the satellite towards a heavenly body such as the sun or a star:

which is applicable to any triple-axis stabilized satellite whatever the arrangement of its thrusters (unlike French Patent No. 2,649,809), which does not call into question the logics conventionally used for the sun, earth or star acquisition modes (unlike French Patent No. 2,659,809), which uses the measurement of a single solar or stellar sensor with a single measurement axis (unlike French Patent No. 2,407,860, European Patent No. 0,338,687 and U.S. Pat. No. 5,080,307) but in combination with other available measurements;

which can easily be programmed in the on-board computer; and the aiming accuracy of which is optimum because of a positional control carried out actively and continuously, by comparing the calculated direction of the heavenly body with the direction aimed at or reference direction.

SUMMARY OF THE INVENTION

To this end the present invention proposes a method of controlling the attitude of a satellite according to which the direction of a predetermined celestial object is defined in a frame of reference related to the satellite. The instantaneous angular velocity vector of the satellite is detected and, by means of an actuating assembly, torques are applied to the satellite which are defined by a control law so as to rotate the satellite about this direction while orienting an aiming axis related to the satellite in the same direction. The direction of the predetermined celestial object is defined in the frame of reference related to the satellite by a first quantity representing a first angle measured between an axis of sight and the projection of this direction onto a first reference plane containing the axis of sight and by a second quantity representing a second angle defined by the axis of sight and the projection of this direction onto a second reference plane containing the axis of sight, the second angle being calculated from the first angle and from the instantaneous angular velocity vector of the satellite.

Compared with the conventional methods known at the present time, the method of the present invention makes it possible to save on one axis for measuring the heavenly body aimed at (namely the use of a single-axis sensor instead of a twin-axis sensor or saving on one single-axis sensor), its redundancy and, possibly, sensor control electronics, and therefore to reduce the weight and cost of the satellite attitude control system; all this without changing the structure of the sun, earth or star acquisition modes.

The method can also be applied to a satellite for dealing with a failure of some of its sensors. In such case, the satellite may already be in orbit.

The calculation method is based on the relationship between the direction of the heavenly body aimed at and its change in a frame of reference related to the satellite, the single measurement of the sensor and its change and the angular velocity measurements.

According to preferred characteristics of the method:

the axis of sight belongs to a sensor with at least one sensing axis, the first reference plane being defined as being perpendicular to the sensing axis;

the second reference plane is perpendicular to the first reference plane and is defined as containing the axis of sight and sensing axis;

the sensor is a single-axis sensor;

the sensor is a twin-axis sensor, a single output of which is used;

the first and second quantities representing the first and second angles are the tangents of these angles;

the control law is of the type:

$$\vec{U} = -K_d * [\vec{\omega} - C * \vec{S}_{s/c}] - K_p * [\vec{S}_{s/c} \wedge \vec{SR}]$$

where:

$\vec{U}$ = demand to be applied to the torque generator $\vec{S}_{s/c}$ = unit vector of the instantaneous direction of the celestial object $\vec{SR}$ = unit vector of the aiming axis forming the rotation reference axis $\vec{\omega}$ = measured velocity vector $C$ = rotation velocity demanded about $\vec{SR}$ $K_d$ = velocity regulation gain $K_p$ = position regulation gain $\wedge$ = vector product (or, in English, cross product)

the celestial object is the sun;

the aiming axis is an axis which is at least approximately close to an inertia axis of the satellite, chosen so as to obtain continuous illumination of a solar generator installed on the satellite, by virtue of which the satellite is in a sun-aimed mode;

the satellite has another sensor with a second axis of sight, suitable for detecting another predetermined celestial object, and the aiming axis is chosen so as to form, with this second axis of sight, an angle at least approximately equal to the (sun) - satellite - (or other celestial object) angle;

the other celestial object is a star, by virtue of which the satellite is in star acquisition mode;

the other celestial object is the earth, by virtue of which the satellite is in earth acquisition mode;

the celestial object is a star; and the satellite also has a terrestrial sensor with a second axis of sight, and the aiming axis is chosen so as to form, with the second axis of sight, an angle at least approximately equal to the star-satellite-earth angle, by virtue of which the satellite is in the mode for the acquisition of the earth from a star.

The invention also proposes a satellite having a body, a sensor with an axis of sight suitable for detecting a predetermined celestial object and supplying a first quantity representing a first angle measured between the axis of sight and the projection of the instantaneous direction of the celestial object onto a first reference plane containing the axis of sight, an actuating unit, an attitude control unit suitable for generating, from the first quantity and a second quantity representing an angle defined by the axis of sight and the projection of this instantaneous direction of the celestial object onto a second reference plane containing the axis of sight, separate from the first reference plane, signals suitable for applying to the satellite, through the actuating unit, torques suitable for rotating the satellite about this direction and orienting an aiming axis in this direction, and a unit for measuring the instantaneous rotation velocity of the satellite. The second representative quantity is applied to the attitude control unit by a preliminary processing unit suitable for calculating the second quantity from the first quantity and from the output signal of the instantaneous rotation velocity measurement unit.

According to preferred characteristics of the satellite:

the sensor is a sensor with a single sensing axis, the first reference plane being perpendicular to the sensing axis, and the second reference plane containing the sensing axis;

the sensor is a solar sensor;

the satellite also has a stellar sensor;

the satellite also has a terrestrial sensor;

the sensor is a stellar sensor;

the actuating unit includes thrusters.

the unit for measuring the instantaneous rotation velocity of the satellite includes gyrometers.

Objects, characteristics and advantages of the invention will emerge from the following description, given by way of non-limitative example, with reference to the accompanying drawings.

DESCRIPTION OF THE PREFERRED EMBODIMENT

Figure 1:
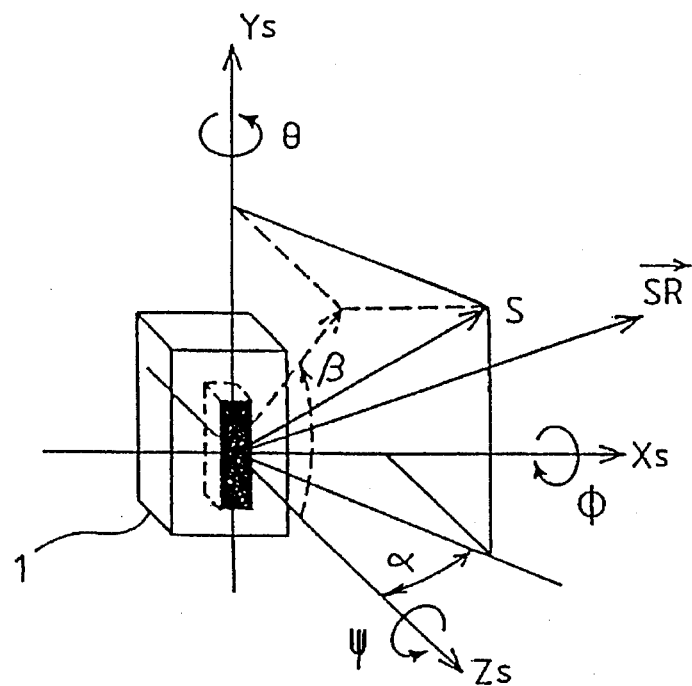
FIG. 1 is a diagram of a single-axis sensor.

A single-axis sensor as shown diagrammatically under the reference numeral 1 in FIG. 1 is in practice a slot extending along an axis Ys referred to as the sensing axis, perpendicular to an axis Xs referred to as the non-measurement axis, while the axis Zs perpendicular to the plane XsYs of the sensor is referred to as the optical axis or axis of sight, intended to be oriented sufficiently close to the celestial object to be detected for the latter to come within the field of view of the sensor.

What has just been stated applies particularly where the sensor is a solar sensor. A stellar sensor generally consists of a charge transfer detector matrix (CCD matrix) onto which an image of the star is projected. The measurement of the sensor in fact consists of two coordinates of the pixel or pixels illuminated by the star. This stellar sensor, generally with dual axes, is able to supply only a single-axis indication if a measurement processing fault results in the provision of a single coordinate instead of two. In such case, the invention can be applied.

If S is the direction of the celestial object, the sensor 1 provides a measurement signal representing the angle α between the axis of sight and the projection of this direction in a reference plane passing through the axis of sight and perpendicular to the sensing axis.

It is important to note that the angle β between the axis of sight and the projection of S in a second reference plane defined by the axis of sight and the sensing axis is on the other hand not measured.

The attitude drifts which the satellite may undergo about the axes Xs, Ys and Zs which, for the sensor, are roll, pitch and yaw axes, are designated by Φ, θ and ψ.

Figure 2:
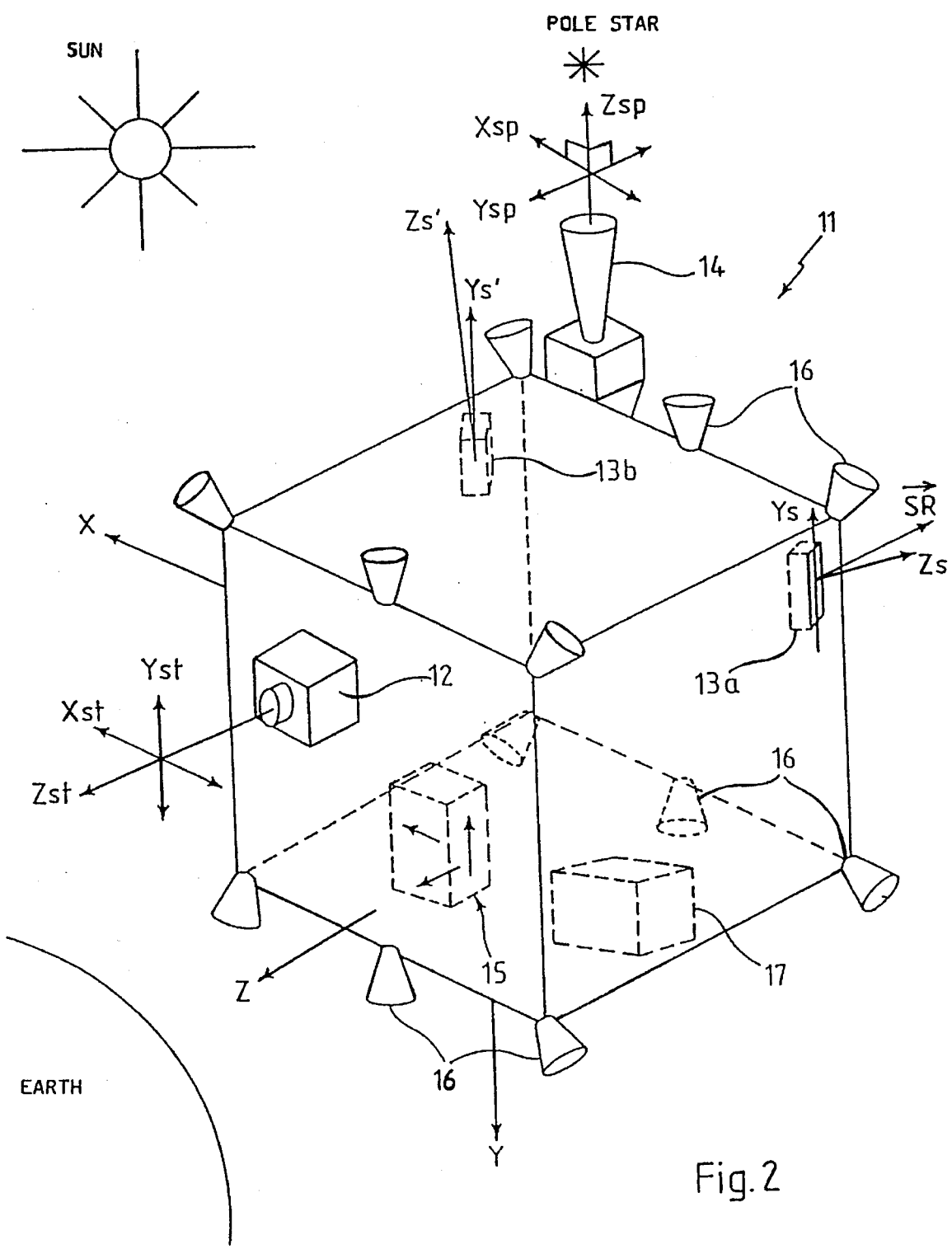
FIG. 2 is a diagrammatic view in perspective of a satellite according to the invention.

FIG. 2 shows diagrammatically the body 11 of a triple-axis stabilized satellite according to the invention, including in addition, in a conventional manner, a solar generator with one or more panels (not shown).

In the case considered here of a given earth orbit, preferably geosynchronous, of low inclination (typically less than 10°) the three axes along which it is sought to stabilize the satellite (that is to say its body) in nominal attitude are, respectively, an axis directed towards the earth, usually termed Z and referred to as the yaw axis, an axis perpendicular to the plane of the orbit and directed towards the south, termed Y and referred to as the pitch axis, and an X axis forming, with the pitch and yaw axes, a positive orthonormal axis system (X, Y, Z), and referred to as the roll axis. In practice, when the orbit is circular, the roll axis is tangent to the orbit and preferably has the same direction as the velocity at which the satellite moves on the orbit. Generally the solar generator extends parallel to the pitch axis.

The body 11 of the satellite has an attitude and orbit control system includes:

a terrestrial detection system 12, here formed by a single twin-axis detector, having an optical axis Zst parallel or close to the Z axis and two measurement axes (or sensing axes) Xst and Yst (in practice orthogonal) transverse to the optical axis, advantageously close or even parallel to the X and Y axes of the satellite respectively (the field of view is for example ±14° around the axis Ys and ±5° around the axis Xs), a solar detection system including a plurality of single-axis solar sensors having axes of sight of different orientations: two sensors 13a and 13b are shown here, with axes of sight Zs and Zs' respectively oriented in the plane XZ at least approximately at 45° from the axes -X and -Z on the one hand and X and -Z on the other hand, and having sensing axes at least approximately parallel to Y, an optional stellar detection system 14, here formed by a twin-axis detector, having an optical axis Zsp pointed towards the north so as-to be able to detect the Pole Star (as a reminder, the Pole Star is very close to the north) and two measurement axes Xsp and Ysp parallel to X and Z; this stellar detection system 14 is in practice offset from the Y axis by a sufficient distance to prevent the solar generator encroaching appreciably into its field of view;

an angular velocity detection unit 15, for example gyrometers, for measuring the angular velocities of the satellite about three axes preferably parallel to the X, Y and Z axes;

an actuating unit, in this case formed by thrusters 16 at least four in number (in this case six), for generating positive or negative control torques about the X, Y and Z axes; and an analogue or digital processing unit 17, for processing the measurements supplied by the detection systems and, by means of control laws which are per se conventional, in the nominal attitude control regime or in reacquisition mode, commands intended for the actuating unit (through filters, limiters and modulators).

The process of the invention is described below with regard to the functional diagram in FIG. 3, involving any one of the single-axis solar sensors (chosen according to the desired direction of rotation) and the angular velocity detection unit 15. In the example in question, aiming is effected by means of the solar sensor 13a.

The various quantities which will be used in the iterative calculation defined below, have the following definitions:

$SX_{s/c}$, $SY_{s/c}$, $SZ_{s/c}$: components of the unit vector of the direction of the heavenly body in satellite axes, SX, SY, SZ: components of the unit vector of the direction of the heavenly body in sensor axes at tile previous moment, SX', SY', SZ': components of the unit vector of the direction of the heavenly body in sensor axes at the present moment, α: angle between the-axis Zs and the projection of the direction of the heavenly body in the plane Xs, Zs in the sensor frame of reference, β: angle between the axis Zs and the projection of the direction of the heavenly body in the plane YsZs in the sensor frame of reference tanα'=SX'/SZ': current measurement of α by the sensor tanα=SX/SZ: previous measurement of α by the sensor used tanβ'=SY'/SZ': current estimation of β

$(\tan\beta')_f$: current filtered value of tanβ

$(\tan\beta)_f$: previous filtered value of tanβ

Φ, θ, and ψ: roll, pitch and yaw micro-rotations between the sensor frames of reference at the previous and current moments Dt: duration of the calculation cycle $$\omega_{xs} = \frac{\Phi}{Dt}, \omega_{ys} = \frac{\theta}{Dt}, \omega_{zs} = \frac{\psi}{Dt}:$$

roll, pitch and yaw velocity in sensor axes $\omega_{xs/c}$, $\omega_{ys/c}$, $\omega_{zs/c}$: roll, pitch and yaw velocities measured by satellite axis M: matrix for converting between the satellite axes and sensor axes $M^{-1}$: inverse matrix of the matrix M It should first of all be noted that there is a change from the heavenly body according to sensor axes, between the previous and current moments, by means of the matrix equation:

$$\begin{bmatrix} SX \\ SY \\ SZ \end{bmatrix} = \begin{bmatrix} 1 & -\psi & \theta \\ \psi & 1 & -\phi \\ -\theta & \phi & 1 \end{bmatrix} \begin{bmatrix} SX' \\ SY' \\ SZ' \end{bmatrix}$$

The variation Δ in the tangent of the measured angle α is equal to: Δ=tanα'- tanα, that is to say:

$$\Delta = \tan\alpha' - \tan\alpha =$$

$$\frac{SX'}{SZ'} - \frac{SX}{SZ} = \frac{SX'}{SZ'} - \frac{SX' - \psi * SY' + \theta * SZ'}{SZ' + \phi * SY' - \theta * SX'}$$

or again:

$$\Delta = \frac{-\phi * \tan\alpha' * \tan\beta' - \tan\alpha' * \tan\alpha * \theta - \tan\beta' * \psi - \theta}{1 - \tan\beta' * \phi - \tan\alpha' * \theta}$$

The estimation of the non-measured angular component β' of the direction of the heavenly body in the sensor frame of reference is effected:

by calculating the instantaneous velocities of rotation in the sensor frame of reference according to the change of frame of reference formula:

$$\begin{bmatrix} \omega_{xs} \\ \omega_{ys} \\ \omega_{zs} \end{bmatrix} = M \begin{bmatrix} \omega_{sx/c} \\ \omega_{ys/c} \\ \omega_{zs/c} \end{bmatrix}$$

whence tanβ' is calculated by the equation:

$$\tan\beta' = -\frac{\omega_{ys} + \tan\alpha * \tan\alpha' * \omega_{ys} + \frac{\Delta}{Dt}}{\omega_{zs} + \omega_{xs} * \tan\alpha'}$$

Advantageously a filtering of tanβ' is carried out in order to eliminate the effect of the cyclic determination of this tangent. This filtering is for example a first order filtering of the type:

$$(\tan\beta')_f = a(\tan\beta)_f + (1-a)\tan\beta'$$

where the subscript f corresponds to the filtered values and where a is a constant.

Finally, there is a progression, in a known manner, from these tangents to the components of the unit vector of the direction of the heavenly body in the sensor frame of reference according to the equations:

$$SX' = \frac{\tan\alpha'}{\sqrt{1 + \tan^2\alpha' + \tan^2\beta'}}$$

$$SY' = \frac{\tan\beta'}{\sqrt{1 + \tan^2\alpha' + \tan^2\beta'}}$$

$$SZ' = \frac{1}{\sqrt{1 + \tan^2\alpha' + \tan^2\beta'}}$$

and then by change of frame of reference these components are determined in the satellite frame of reference:

$$\begin{bmatrix} SX_{s/c} \\ SY_{s/c} \\ SZ_{s/c} \end{bmatrix} = M \begin{bmatrix} SX' \\ SY' \\ SZ' \end{bmatrix}$$

The attitude control proper is then obtained by means of a conventional law, for example the one already presented above in the preamble:

$$\vec{U} = -Kd*[\vec{\omega} - C*\vec{S}_{s/c}] - Kp*[\vec{S}_{s/c} \wedge \vec{SR}]$$

where $\vec{SR}$ has the same meaning as before.

Figure 3:
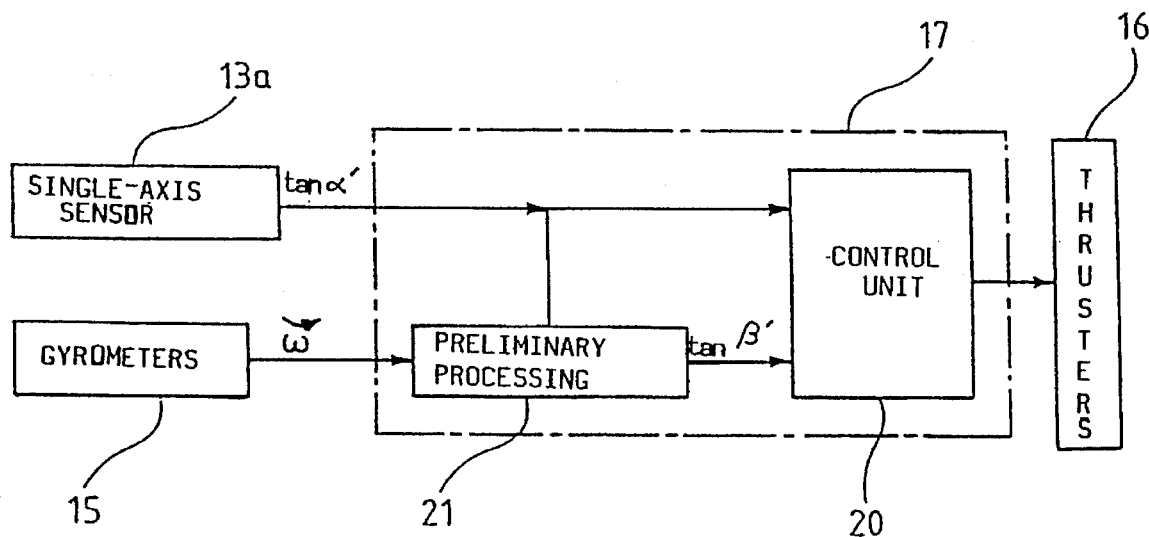
FIG. 3 is a functional diagram of an aiming device according to the invention.

In FIG. 3 can thus be seen the sensor whose field of view contains the satellite-heavenly body direction (in this case the single-axis sensor 13a), the angular velocity detection unit 15 formed by gyrometers, the processing unit 17 and the actuating means 16.

The processing unit 17 includes a control unit 20, conventional in itself, suitable for supplying attitude control signals $\vec{U}$ from two quantities characteristic of the angular orientation of the satellite-heavenly body direction (in this case the tangents of the instantaneous angles $\alpha'$ and $\beta'$).

According to the invention one of these quantities is derived, not directly and solely from the output of an angular position sensor, but from the instantaneous angular velocity of the satellite in the frame of reference (X, Y, Z) related to it.

The processing unit 17 includes for this purpose a preliminary processing unit 21 suitable for calculating as indicated above, from the single quantity $\tan\alpha$ supplied by the sensor 13a and the instantaneous angular velocity $\vec{\omega}$, the other quantity $\tan\beta$ required by the control unit.

Figure 4:
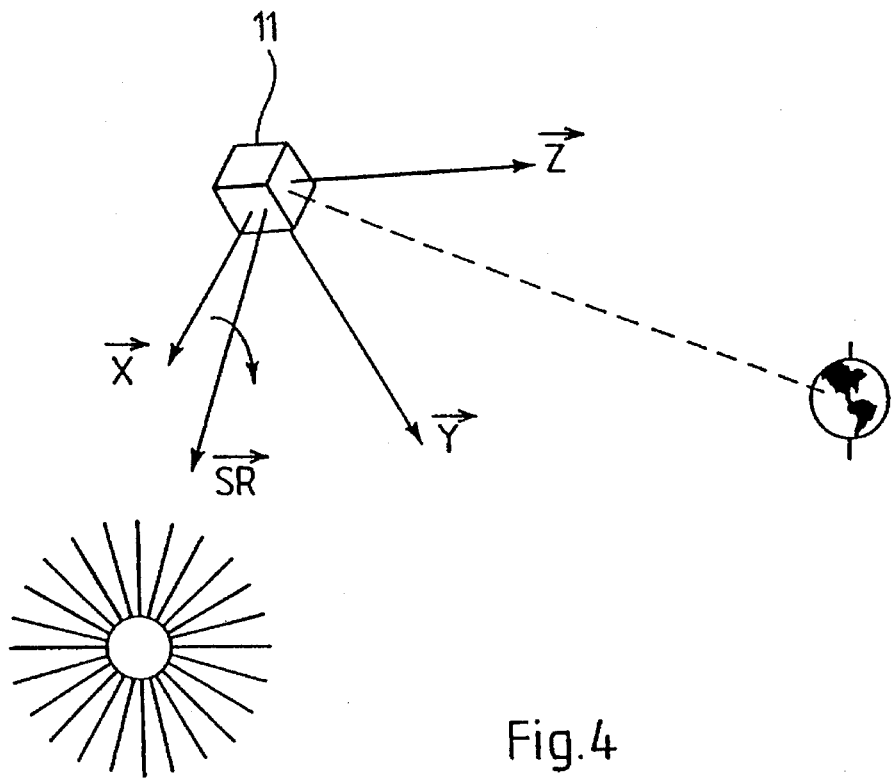
FIG. 4 is a perspective view of the satellite of FIG. 2 in the earth seeking phase.
Figure 5:
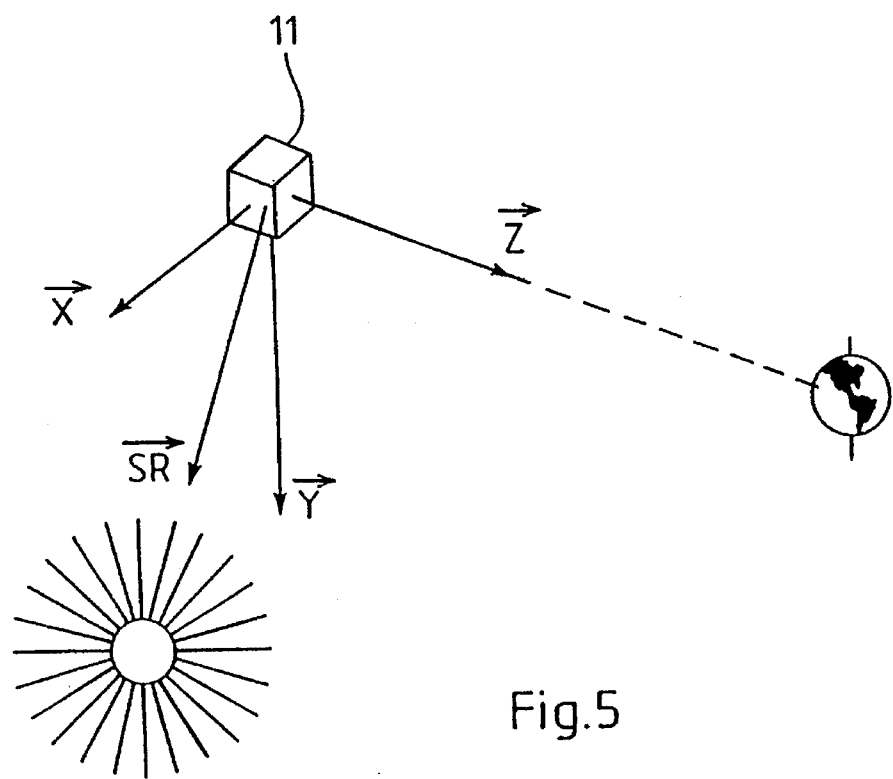
FIG. 5 is a diagrammatic view of the satellite after sensing of the earth.

The satellite 11 in earth seeking phase can be seen in FIG. 4. The satellite 11 is rotating about the axis $\vec{SR}$ pointed towards the sun. This rotation brings the axis of sight of the terrestrial sensor (which is identical with the yaw axis of the satellite) facing the earth, thus enabling the latter to be detected. This situation is shown diagrammatically in FIG. 5.

It goes without saying that the above description has been put forward only by way of non-limitative example and that many variants could be proposed by a person skilled in the art without departing from the scope of the invention. Thus, for example, the stellar sensor could be omitted: a single-axis solar sensor with an axis of sight approximately directed along Z could then be added in order to supplement the field in which it is possible, at any time, to search for the sun. Likewise the process of the invention can be applied without any problem:

to the case of a satellite provided with at least one twin-axis solar or stellar sensor formed by two coupled single-axis sensors, one of which happened to fail; and to the case of a satellite provided with at least one twin-axis stellar sensor, the measurements of which along one of the axes is unavailable because of a failure.

We claim:

1. A method of controlling the attitude of a satellite comprising the steps of:

defining a direction of a predetermined celestial object in a frame of reference related to said satellite;

detecting an instantaneous angular velocity vector of said satellite;

applying torques to said satellite;

defining said torques by a control law to rotate said satellite about said direction;

orienting an aiming axis related to said satellite in said direction;

representing as a first quantity a first angle measured between an axis of sight and a projection of said direction onto a first reference plane containing said axis of sight;

representing as a second quantity a second angle defined by said axis of sight and a projection of said direction onto a second reference plane containing said axis of sight; and calculating said second angle from said first angle and from said instantaneous angular velocity vector of said satellite.

2. The method according to claim 1, further comprising the step of selecting a sensor with at least one sensing axis whereby said axis of sight represents said sensor with at least one sensing axis, and further wherein said first reference plane is defined as being perpendicular to said at least one sensing axis.

3. The method according to claim 2, further comprising the step of defining said second reference plane as being perpendicular to said first reference plane containing said axis of sight and containing said at least one sensing axis.

4. The method according to claim 2, further comprising the step of defining said sensor as being a single-axis sensor.

5. The method according to claim 3, further comprising the step of defining said sensor as being a single-axis sensor.

6. The method according to claim 2, further comprising the step of defining said sensor as being a twin-axis sensor of which a single output is used.

7. The method according to claim 3, further comprising the step of defining said sensor as being a twin-axis sensor of which a single output is used.

8. The method according to claim 1, further comprising the step of defining said first and second quantities representing said first and second angles as being tangents of said first and second angles.

9. The method according to claim 1, further comprising the step of defining said control law defining said torques as:

$$\vec{U} = -Kd*[\vec{\omega} - C*\vec{S}_{s/c}] - Kp*[\vec{S}_{s/c} \wedge \vec{SR}]$$

where:

$\vec{U}$ = demand to be applied to the torque generator $\vec{S}_{s/c}$ = unit vector of the instantaneous direction of the celestial object $\vec{SR}$ = unit vector of the aiming axis forming the rotation reference axis $\vec{\omega}$ = measured velocity vector C = rotation velocity demanded about $\vec{SR}$ Kd = velocity regulation gain Kp = position regulation gain $\wedge$ = vector product.

10. The method according to claim 1, further comprising the step of defining said celestial object as being the Sun.

11. The method according to claim 10, further comprising the step of defining said aiming axis as being an axis which is approximately close to an inertia axis of said satellite, and wherein said aiming axis is chosen to obtain continuous illumination of a solar generator installed on said satellite, by virtue of which said satellite is in a Sun-aimed mode.

12. The method according to claim 10, further comprising the step of defining said satellite as having a second sensor with a second axis of sight for detecting a second predetermined celestial object, and wherein said aiming axis is chosen to form, with said second axis of sight, an angle approximately equal to an angle between the Sun, said satellite and said second predetermined celestial object.

13. The method according to claim 12, further comprising the step of defining said second predetermined celestial object as being a star and wherein said satellite is in a star acquisition mode.

14. The method according to claim 12, further comprising the step of defining said second predetermined celestial object as being the Earth, and wherein said satellite is in an Earth acquisition mode.

15. The method according to claim 1, wherein said celestial object is a star.

16. The method according to claim 14, further comprising the step of defining said satellite as further having a terrestrial sensor having a second axis of sight, and wherein said aiming axis is chosen so as to form with said second axis of sight, an angle approximately equal to an angle between said star, said satellite, and the Earth, by virtue of which said satellite is in said Earth acquisition mode.

17. The method according to claim 1, further comprising the step of defining said satellite as being triple-axis stabilized on a geosynchronous orbit with an inclination of less than ten degrees.

18. A satellite comprising:
a body;
a sensor connected to said body, said sensor having an output and an axis of sight suitable for detecting a predetermined celestial object and supplying a first quantity to said output, said first quantity representing a first angle measured between said axis of sight and a projection of an instantaneous direction of said celestial object onto a first reference plane containing said axis of sight;
a measurement unit for providing an output signal obtained by measuring an instantaneous rotation velocity of said satellite;
a preliminary processing unit having an output and a first input connected to said output of said sensor, and a second input connected to said output signal of said measurement unit wherein said preliminary processing unit calculates a second quantity representing an angle defined by said axis of sight and said projection of said instantaneous direction of said celestial object onto a second reference plane containing said axis of sight from said first quantity and from said output signal of said measurement unit;
an attitude control unit having an input connected to said output of said sensor, and an output, said attitude control unit being suitable for generating control signals at said output from said first quantity and said second quantity; and
an actuating unit connected to said attitude control unit to receive said control signals and respond by applying torques for rotating said satellite about said instantaneous direction and orienting an aiming axis in said instantaneous direction.

19. The satellite according to claim 18, wherein said sensor has a single sensing axis perpendicular to both said first reference plane and said second reference plane containing said sensing axis.

20. The satellite according to claim 18, wherein said sensor is a solar sensor.

21. The satellite according to claim 18, wherein said satellite further comprises a stellar sensor.

22. The satellite according to claim 18, wherein said actuating unit includes a set of thrusters.

23. The satellite according to claim 18, wherein said unit for measuring said instantaneous rotation velocity of said satellite includes a set of gyrometers.

24. A method of controlling the attitude of a satellite having an actuating assembly, and defining an aiming axis related to said satellite, said method comprising the steps of:
defining a direction of a predetermined celestial object in a frame of reference related to said satellite;
detecting an instantaneous angular velocity vector of said satellite; and
applying, by means of said actuating assembly, torques to said satellite which are defined by a control law so as to rotate said satellite about said direction while orienting said aiming axis in said direction;
whereby said direction of said predetermined celestial object is defined in said frame of reference related to said satellite by a first quantity representing a first angle measured between an axis of sight and a projection of said direction onto a first reference plane containing said axis of sight and by a second quantity representing a second angle defined by said axis of sight and a projection of said direction onto a second reference plane containing said axis of sight, said second angle being calculated from said first angle and from said instantaneous angular velocity vector of said satellite.

25. A satellite comprising:
a body which has an aiming axis;
a sensor having an axis of sight suitable for detecting a predetermined celestial object, said sensor having an output for supplying a first quantity representing a first angle measured between said axis of sight and a projection of an instantaneous direction of said celestial object onto a first reference plane containing said axis of sight;
an actuating unit;
an attitude control unit suitable for generating, from said first quantity and a second quantity representing an angle defined by said axis of sight and a projection of said instantaneous direction of said celestial object onto a second reference plane containing said axis of sight, separate from said first reference plane, signals suitable for applying to said satellite, through said actuating unit, torques suitable for rotating said satellite about said instantaneous direction and orienting said aiming axis in said instantaneous direction; and
a unit for measuring the instantaneous rotation velocity of said satellite; and
a preliminary processing unit for calculating said second quantity from said first quantity and from said output signal of said instantaneous rotation velocity measurement unit, said preliminary processing unit being arranged to apply said second representative quantity to said attitude control unit.

26. A method for controlling the attitude of a satellite with respect to a predetermined celestial body, said satellite comprising a geometrical frame of reference, an aiming axis fixed with respect to said geometrical frame of reference, an axis of sight fixed with respect to said geometrical frame of reference, a first reference plane containing said axis of sight, and a second reference plane containing said axis of sight, said method comprising the steps of:

sensing a first value representative of a first angle defined by said axis of sight with a projection of an instantaneous direction of said predetermined celestial body onto said first reference plane;

sensing an instantaneous angular velocity vector of said satellite within said geometrical frame of reference;

calculating from said first value and from said instantaneous angular velocity vector a second value representative of a second angle defined by said axis of sight with said projection of said instantaneous direction of said predetermined celestial body onto said second reference plane; and applying torques to said satellite, said torques being defined by a predetermined control law from said first and second values so as to aim said aiming axis at said predetermined celestial body as well as to rotate said satellite about said direction of said predetermined celestial body.

27. A satellite comprising:

a body with a geometrical frame of reference;

an aiming axis fixed with respect to said geometrical frame of reference;

a viewing means for sensing a predetermined celestial body having an axis of sight, a first reference plane including said axis of sight, and a second reference plane including said axis of sight, said viewing means being adapted to provide a first value representative of a first angle between said axis of sight and a projection of an instantaneous direction of said predetermined celestial body onto said first reference plane;

a rotation velocity sensing means for sensing an instantaneous rotation velocity of said satellite and providing rotation velocity values;

a preliminary processing means connected to said viewing means and to said rotation velocity sensing means for calculating from said first value and said rotation velocity values a second value representative of a second angle between said axis of sight and a projection of said instantaneous direction of said predetermined celestial body onto said second reference plane;

attitude control means connected to said viewing means and to said preliminary processing means for generating torque signals from said first and second values to aim said aiming axis at said predetermined celestial body and to rotate said satellite about said direction of said predetermined celestial body; and actuating means for applying torques to said satellite as a response to said torque signals.

* * * * *

UNITED STATES PATENT AND TRADEMARK OFFICE
CERTIFICATE OF CORRECTION

PATENT NO. : 5,458,300
DATED : October 17, 1995
INVENTOR(S) : Patrick Flament and Miguel Molina-Cobos It is certified that error appears in the above-indentified patent and that said Letters Patent is hereby corrected as shown below:

Column 1, line 12, after "heavenly" insert ---- object, ----.

Column 2, line 31, after "direction;" insert ---- and ----.

Column 3, line 1, delete "Patents" insert ---- patents ----.

Column 7, line 29, delete "." insert ---- ; and ----.

Column 8, line 58, delete "as-to" insert ---- as to ----.

Column 9, line 23, delete "$SX_{s/c'}, SY_{s/c'}, SZ_{s/c}:$" insert ---- $SX_{s/c}, SY_{s/c}, SZ_{s/c}:$ ----.

UNITED STATES PATENT AND TRADEMARK OFFICE
CERTIFICATE OF CORRECTION

PATENT NO. : 5,458,300  
DATED : October 17, 1995  
INVENTOR(S) : Patrick Flament and Miguel Molina-Cobos Page 2 of 2

It is certified that error appears in the above-indentified patent and that said Letters Patent is hereby corrected as shown below:

Column 9, line 26, delete "tile" insert ---- the ----.

Column 9, line 32, delete "the-axis" insert ---- the axis ----.

Column 14, line 67, delete "of;" insert ---- of: ----.

Signed and Sealed this

Twentieth Day of February, 1996

BRUCE LEHMAN

Attest:

*Attesting Officer*     *Commissioner of Patents and Trademarks*